United States Patent Office 3,452,049
Patented June 24, 1969

3,452,049
MONO-MAGNESIUM POLYAMINO ETHYLENE-DIAMINE TETRAACETATE:GLUCONO CITRATE COMPLEX
Alfred R. Globus, Long Island City, N.Y., assignor to Guardian Chemical Corporation, Long Island City, N.Y., a corporation of Delaware
No Drawing. Filed Sept. 24, 1965, Ser. No. 490,128
Int. Cl. C07f 3/02; A61k 5/00
U.S. Cl. 260—343.5                    19 Claims

ABSTRACT OF THE DISCLOSURE

Chelating and sequestering agents for sequestering calcium having particular utility in removing soft tartar and other calcium deposits from teeth comprising a magnesium poly alkanolamino ethylene diamine tetraacetate:glucono citrate complex and method of preparing and using the same.

---

This invention relates to chelating and sequestering agents. It more particularly relates to a particular chelating and sequestering agent for use in sequestering calcium. This invention has particular utility in removing soft tartar and other calcium deposits from teeth.

While there have been many attempts made to remove, using chemical means, the thin films and superficial stains caused by calcium deposition from the teeth and to prevent the formation of tartar which is a calcareous deposit on the tooth enamel, these have not proved successful, for such means as have been successful in removing or preventing such deposits, inevitably etched or opaqued the teeth.

The sequestering and/or chelating agents which have been effective in removing these deposits, when used in sufficiently high concentrations have also resulted in extensive tooth damage. This has been demonstated conclusively on extracted teeth, the destruction effect of such agents becoming immediately apparent.

This invention has for an object the production of a novel chelating and sequestering agent.

Another object of this invention is to provide a method of manufacturing the novel chelating and sequestering agent of this invention.

Still another object of the invention is to provide a novel chelating and sequestering agent capable of removing soft tartar and other calcium deposits from teeth without any untoward side effects.

A further object of this invention is to provide a novel prophylactic composition utilizing the chelating and sequestering agent of this invention.

Other and additional objects of this invention will become apparent from a consideration of this entire specification.

The novel sequestering and chelating agent of this invention is suitably prepared by mixing citric acid, D-gluconic acid and mildly alkaline magnesium hydroxy carbonate and heating the mixture to an extent and temperature sufficient to remove water but below the decomposition temperature of any component of the mixture or of the dehydration product thereof. The magnesium glucono citrate thus formed is reacted with ethylene diamine tetra-acetic acid in an aqueous alkanol amine solution, such as, for example, propanol amine, tri-ethanol amine, mono-ethanol amine, etc. The product thus formed is a magnesium polyamino ethylene diamine tetra-acetate:glucono citrate complex.

The magnesium hydroxy carbonate used in the preparation of this compound is somewhat special. Since mild alkalinity of the magnesium containing moiety is essential, it is not possible to use magnesium oxide or hydroxide since they are too alkaline. Similarly, magnesium carbonate cannot be used because it is not sufficiently alkaline for the purposes of this synthesis. An addition product, however, of magnesium oxide to slurried magnesium carbonate produces an excellent, mildly alkaline magnesium hydroxy carbonate which is well suited to the practice of this invention. The addition product is dried and then ground to a proper state of fineness for use in reaction with a citric acid and gluconic acid, as set forth above. An alternate of the aforementioned preparation of magnesium hydroxy carbonate involves the slurrying of magnesium hydroxide, carbonation of the slurry, drying of the carbonate slurry, and grinding as aforesaid.

The mono-magnesium polyamino ethylene-diamine tetraacetate:glucono citrate complex capable of binding calcium is then reacted with a calcium salt and preferably calcium phosphate, e.g., calcium hydrogen phosphate or calcium ortho-phosphate whereby a magnesium calcium polyamino ethylene-diamine tetra-acetate:glucono citrate complex is formed. Each mol of the complex in accordance with the invention can hold two bivalent cations, e.g., a di-magnesium, mono-magnesium mono-calcium or di-calcium complex is possible. As there is formed as the intermediate a mono-magnesium complex, the intermediate product is capable of binding one more bivalent cation. On reaction with the calcium salt there is formed accordingly a mono-calcium compound which can bind one more bivalent cation. This compound is the chelating and sequestering agent of this invention. The mono magnesium mono-calcium complex acts rapidly to withdraw calcium from the tartar and other soft deposits on the tooth causing absolutely no etching of the tooth enamel. This is because of the mono-magnesium mono-calcium complex only removes calcium in the form of soft tartar but not calcium which is a component of the tooth enamel.

The preparation of the magnesium hydroxycarbonate is hereinafter set forth in detail, although it is to be understood that other methods of producing the same may be employed.

A heavy slurry of magnesium carbonate with magnesium hydroxide is prepared having a ratio of not less than 2½ mols of magnesium carbonate to each mol of magnesium hydroxide and preferably having a ratio of 4 mols of magnesium carbonate to 1 mol of magnesium hydroxide. The slurried material is first dried under vacuum or, alternatively, dried at low temperatures in order to remove the water, and the dried product heated to a temperature of at least 125° C. and preferably to a temperature of between 150–175° C. but not higher than 220° C. as the same may result in inactivation. During the drying, the weight loss of the resulting magnesium hydroxycarbonate as compared with the previously thoroughly dried product used as starting material is from 3.5–3.9%.

The heating is most advantageously carried out slowly in order to avoid decomposition by undue calcination with a resultant decrease in activity. Generally, the temperature of the dried powder is raised slowly over a period of 4–6 hours to the final temperature and maintained at that temperature for another 8–16 hours in order to attain equilibrium. The resulting white to slightly yellowish powdery product is ground and screened as some lumping may have taken place.

The ground material is added to the starting mixture of citric acid and gluconic acid which has first been dried under vacuum at 60–70° C. If the starting citric acid is designated as "anhydrous" no preliminary drying may be necessary.

The dried magnesium hydroxycarbonate is employed in an amount of from 15–48 parts by weight, and preferably from 20–40 parts by weight per 100 parts by weight of the dry acids.

After intimate mixing and grinding, if the same is necessary, the mixture is subjected to slow and gradual heating to a temperature above the boiling point of water, generally to about 120° C. and most preferably between 110–125° C. and the heating continued for a period of 15–24 hours. Temperatures of 130° C. must be avoided as the use of excessively high temperatures will cause fusing of the product into a solid cake.

The time required for the heating may be reduced somewhat by treating the product in the form of thin layers and also by sweeping out the atmosphere in the heating oven by means of an inert gas, such as, for example, nitrogen or argon. The use of carbon dioxide must be avoided as the same is not inert in the instant process and under no circumstances can be employed.

During the heating, the mixture of previously thoroughly dried powders again splits off water, approximately 3.6–4.2% by weight of the charge, and then attains equilibrium. Further heating at these temperatures produces very little weight change. The water which is split off appears to be derived from the original acids and not by reaction of the acids with the magnesium hydroxycarbonate, the latter remaining substantially unchanged as is evidenced by the fact that very little carbon dioxide is released during the heating steps as would have been the case if an appreciable reaction had taken place between the acids and the magnesium hydroxycarbonate.

In accordance with the invention, the ethylene-diamine tetra-acetic acid is suspended in water and the magnesium glucono citrate is added while rapidly stirring the mixture, reaction taking place to form magnesium ethylenediamine tetra-acetic acid:glucono citrate. The alkanolamine is added slowly during the reaction, the pH being adjusted upwardly until the suspension clears. Preferably during this time the mixture is heated up to 70–90° C. for several hours to react the alkanolamine glucono citrate and ethylene-diamine tetra-acetic acid to form a solution of about 46% of complex. Heating is not necessary as the reaction will proceed albeit slowly at room temperature. As alkanolamine, ethanolamine, diethanolamine, triethanolamine, propanolamine, hexanolamine may be employed. An excess of the alkanolamine, i.e., ethanolamine, is then added after solution has been achieved to provide a stable complex. If the complex is formed in the absence of heat, the reaction solution must be allowed to stand for several days. Where heat is employed, several hours are sufficient to complete formation of the complex. Stability of the complex is obtained by bringing the solution up to a pH of about 8 by addition to the solution of an excess of the alkanolamine.

The product magnesium polyalkanol-amino ethylenediamine tetra acetate:glucono citrate complex is then reacted with an equivalent amount of an insoluble calcium phosphate [$CaHPO_4$ or $Ca(PO_4)_3$] at 48° C. for 4 hours to introduce calcium to produce the mono-magnesium mono-calcium polyalkanolamino ethylene-diamine tetraacetate:glucono citrate complex.

The sequestering and chelating agent of this invention is used in conventional toothpaste or tooth powder formulation such as the following:

Toothpaste

| | Parts by weight |
|---|---|
| Carboxymethyl cellulose | 1 |
| Sorbitol (70%) | 29.8 |
| Water | 8 |
| Soluble saccharin | .1 |
| Hyamine 10X | .1 |
| Dicalcium phosphate duo hydrate | 30 |
| Diatomaceous earth (finest polished grade) | 27 |
| Mineral oil 80–90 viscosity | 1 |
| Sodium lauryl sulfate | .2 |
| Peppermint oil | 0.5 |
| Spearmint oil | 0.5 |

Tooth powder

| | Parts by weight |
|---|---|
| Carboxymethyl cellulose | 1 |
| Soluble saccharin | .1 |
| Hyamine 10X | .1 |
| Dicalcium phosphate duo hydrate | 30 |
| Diatomaceous earth (finest polished grade) | 40.8 |
| Sodium lauryl sulfate | 2 |
| Peppermint oil | .5 |
| Spearmint oil | .5 |
| Air-floated silica | 25 |

The complex is suitable for use as a 40 or 50 weight percent solution. If available, it can be used in the dry state. The chelating and sequestering agent of this invention has a pH of about 7 to 8.5 preferably 7.8 to 8.2. It has been established in testing to be non-toxic to rats in doses of up to 5 grams per kilo and has in simulated long-use testing been shown to be non-eroding and non-etching with respect to the enamel of the teeth.

The magnesium polyamino ethylene diamine tetraacetate:glucono citrate complex, in accordance with the invention, can be converted into its mono-calcium derivative in accordance with another feature of this invention by introducing the magnesium polyamino ethylenediamine tetra-acetate:glucono citrate complex to a toothpaste or powder formulation containing calcium. In order not to form the dicalcium derivative, all of the calcium present in the toothpaste or tooth powder formulation must be in insoluble form, preferably in the form of a carbonate, phosphate or silicate. Preferably, the calcium is introduced into the formulation as dicalcium phosphate. The dicalcium phosphate has been found under no circumstances to result in the formation of the dicalcium complex derivative. If a small excess of calcium is present in the insoluble form, only the mono-calcium derivative is obtained. Preferably, the mono-calcium derivative is formed in an alkaline medium and, most preferably, at a pH of 8 to 8.5. In an acid medium, hydrolysis of the magnesium polyaminoethylene diamine tetra-acetate: glucono citrate complex takes place.

In forming the toothpaste or tooth powder formulation capable of removing plaque from teeth and retarding or preventing tartar formation without etching or damaging the dental enamel in any way, the complex in accordance with the invention is employed in a concentration of 1 to 25%, and preferably in a concentration of within the range of 5 to 10%.

The following examples are illustrative of the invention but are not to be construed as limiting thereof:

EXAMPLE 1

A slurry of 3.5 mols of magnesium carbonate and 1 mol of magnesium hydroxide was prepared. The slurried material was dried in order to remove the water and the dried product heated to 115° C. for 16 hours. The resulting powder was ground and added to a mixture of anhydrous citric and gluconic acids. The dried magnesium hydroxycarbonate was employed in an amount of 45 parts by weight per 100 parts by weight of the dry acid. The mixture was subjected to heating at a temperature of 115° C. for 16 hours. The product was off-white to yellowish in color and had the following composition:

| | |
|---|---|
| Free citric acid (anhydrous) and D-gluconic lactones _____ percent__ | 59 |
| Magnesium salts of said acids _____ do____ | 6 |
| Magnesium hydroxycarbonate _____ do____ | 32 |
| Citraconic acid _____ do____ | 0.2 |
| Balance _____ Inert materials | |

EXAMPLE 2

Example 1 was repeated except that the mixture of acids was replaced with an equal amount of a mixture of gluconic and citric acid in its hydrated form. The resulting product had the following composition:

| | |
|---|---|
| Free citric acid (anhydrous) and D-gluconic lactones _____ percent__ | 53.7 |
| Magnesium salts of said acids _____ do____ | 7.0 |
| Magnesium hydroxycarbonate _____ do____ | 33.5 |
| Balance _____ Inert materials | |

EXAMPLE 3

Example 1 was again repeated except that 53 parts of citric acid, 7 parts of gluconic acid, 26 parts of magnesium hydroxycarbonate, and 4 parts of magnesium acid citrate were used. The resulting product had the following composition:

| | |
|---|---|
| Free citric acid (anhydrous) and D-gluconic lactones _____ percent__ | 57.3 |
| Magnesium salts of said acids _____ do____ | 5.0 |
| Magnesium hydroxycarbonate _____ do____ | 24.0 |
| Balance _____ Inert materials | |

EXAMPLE 4

2.5 grams of magnesium glucono:citrate mixed with 22 grams of ethylenediamine tetra-acetic acid dissolved in triethanolamine and heated for 4 hours at 70° C. to produce 46 grams of magnesium triethanolamine ethylene-diamine tetra-acetate:glucono citrate.

EXAMPLE 5

Example 4 was repeated using in place of triethanolamine, diethanolamine to produce 41 grams of magnesium diethanolamine ethylene diamine tetra-acetate:glucono citrate.

EXAMPLE 6

46 grams of the product of Example 4 were admixed with 50 grams of calcium orthophosphate and the mixture heated for 2 hours at 80° C. to produce the monocalcium mono-magnesium triethanolamine ethylenediamine tetra-acetate:glucono citrate complex.

EXAMPLE 7

A toothpaste formulation in accordance with the invention was prepared having the following composition:

| | Parts by weight |
|---|---|
| Carboxymethyl cellulose _____ | 1 |
| Sorbitol (70%) _____ | 22.8 |
| Water _____ | 8 |
| Soluble saccharin _____ | .1 |
| Hyamine 10X _____ | .1 |
| Dicalcium phosphate duo hydrate _____ | 30 |
| Diatomaceous earth (finest polished grade) _____ | 27 |
| Mineral oil 80–90 viscosity _____ | 1 |
| Sodium lauryl sulfate _____ | 2 |
| Peppermint oil _____ | 0.5 |
| Spearmint oil _____ | 0.5 |
| Magnesium polyaminoethylene diamine tetra-acetate:glucono citrate complex _____ | 7 |

EXAMPLE 8

A tooth powder formulation accordance with the invention was prepared having the following composition:

| | Parts by weight |
|---|---|
| Carboxy methyl cellulose _____ | 1 |
| Soluble saccharin _____ | .1 |
| Hyamine 10X _____ | .1 |
| Dicalcium phosphate duo hydrate _____ | 30 |
| Diatomaceous earth (finest polished grade) _____ | 40.8 |
| Sodium lauryl sulfate _____ | 2 |
| Peppermint oil _____ | .5 |
| Spearmint oil _____ | .5 |
| Air-floated silica _____ | 25 |
| Magnesium polyaminoethylene diamine tetra acetate:glucono citrate complex _____ | 7 |

I claim:
1. Magnesium poly lower alkanolamino ethylene-diamine tetra-acetate:glucono citrate complex.
2. The complex claimed in claim 1 wherein said alkanol is ethanol.
3. The complex claimed in claim 1 wherein said alkanol is diethanol.
4. The complex claimed in claim 1 wherein said alkanol is triethanol.
5. The complex claimed in claim 1 wherein said alkanol is propanol.
6. The complex claimed in claim 1 wherein said alkanol is hexanol.
7. Magnesium polyamino ethylene diamine tetra-acetate:glucono citrate complex wherein said amino is derived from a water-soluble mono-, di- and tri-alkanolamine wherein said alkanol moiety contains up to 6 carbon atoms.
8. Mono-magnesium polyamino ethylene diamine tetra-acetate:glucono citrate complex wherein said amino is derived from a water-soluble mono-, di- and tri-alkanolamine wherein said alkanol moiety contains up to 6 carbon atoms.
9. Mono calcium mono magnesium poly lower alkanol amino ethylenediamine tetra-acetate:glucono citrate.
10. The complex claimed in claim 9 wherein said alkanol is ethanol.
11. The complex claimed in claim 9 wherein said alkanol is diethanol.
12. The complex claimed in claim 9 wherein said alkanol is triethanol.
13. The complex claimed in claim 9 wherein said alkanol is propanol.
14. The complex claimed in claim 9 wherein said alkanol is hexanol.
15. The complex claimed in claim 9 wherein said alkanol is water-soluble and contains up to 6 carbon atoms.
16. The method of making the complex of claim 1, which comprises admixing magnesium hydroxy carbonate, citric acid and D-gluconic acid, using 15 to 48 parts by weight of magnesium hydroxy carbonate per hundred parts by weight of acid, heating said mixture to a temperature of from above the boiling point of water to about 125° C. for a period of from about 15 to 24 hours to form magnesium glucono citrate treating said magnesium glucono citrate with ethylene diamine tetra-acetic acid in the presence of water and a member selected from the group consisting of mono-, di- and tri-lower alkanolamines, wherein said alkanol moiety contains up to 6 carbon atoms.

17. The method of preparing the complex of claim 9 which comprises reacting the material of claim 1 with a calcium salt to form the corresponding mono-calcium mono-magnesium poly lower alkanolamino ethylene-diamine tetra-acetate:glucono citrate.

18. The method of claim 17 wherein said calcium salt is a calcium phosphate.

19. The method of claim 17 wherein said calcium salt is calcium orthophosphate.

No references cited.

ALEX MAZEL, *Primary Examiner.*

J. A. NARCAVAGE, *Assistant Examiner.*

U.S. Cl. X.R.

260—343.6; 424—54, 279